United States Patent [19]
Hadidi et al.

[11] Patent Number: 4,780,859
[45] Date of Patent: Oct. 25, 1988

[54] METHOD OF INTERPRETING SEISMIC DATA

[75] Inventors: Mohamed T. Hadidi, Dallas, Tex.; Andrejs Jurkevics, Arlington, Va.; Andrew F. Linville, Jr., Dallas, Tex.

[73] Assignee: Mobil Oil Corporation, New York, N.Y.

[21] Appl. No.: 23,313

[22] Filed: Mar. 9, 1987

[51] Int. Cl.⁴ .............................................. G01V 1/36
[52] U.S. Cl. ...................................... 367/43; 367/47; 364/421
[58] Field of Search ...................... 367/38, 43, 42, 47, 367/63; 364/421; 73/602

[56] References Cited

U.S. PATENT DOCUMENTS

| | | | |
|---|---|---|---|
| 3,396,365 | 8/1968 | Kerns | 367/40 |
| 4,052,889 | 10/1977 | Mucciardi et al. | 73/602 |
| 4,209,672 | 6/1980 | Nitta et al. | 367/13 X |
| 4,213,183 | 7/1980 | Barron et al. | 364/507 |
| 4,310,721 | 1/1982 | Manley et al. | 364/513.5 |
| 4,545,039 | 10/1985 | Savit | 367/39 |
| 4,545,250 | 10/1985 | Miwa | 73/602 |
| 4,608,673 | 8/1986 | Lazear | 367/38 X |
| 4,655,288 | 4/1987 | Shimura et al. | 73/602 X |

OTHER PUBLICATIONS

*A Comparison Between Spiking and Signature Convolution*; Bob Godfrey et al.; Society of Exploration Geophysicists, Atlanta, Ga., (1984).
*Pre-Stack Wavelet Deconvolution*; Mark Potts et al.; Society of Exploration Geophysicists, 52nd Annual Meeting, Dallas, Tex., (1982).

Primary Examiner—Thomas H. Tarcza
Assistant Examiner—Tod R. Swann
Attorney, Agent, or Firm—Alexander J. McKillop; Michael G. Gilman; Charles J. Speciale

[57] ABSTRACT

Method to process seismic data to yield useful information regarding the subsurface area explored. Seismic data which is acquired from the seismic exploration is autocorrelated and the amplitude spectrums estimated, stacked and averaged to reduce the effects of nonwhite reflectivity upon the data. The amplitude spectrum is cepstral windowed a first time to reduce the effects of reflectivity leakage on the amplitude spectrum, amortized at both low and high frequencies so that the amplitude spectrum will approximate the analog wavelet and cepstral windowed a second time to eliminate any remaining rapidly varying components of the amplitude spectrum. The resultant amplitude spectrum is then used to estimate the phase spectrum for the wavelet and a two-sided least squares filter is then designed to shape the estimated seismic wavelet into a zero-phase, low sidelobe output wavelet.

23 Claims, 4 Drawing Sheets

METHOD OF INTERPRETING SEISMIC DATA

BACKGROUND OF THE INVENTION

This invention relates to the processing of geophysical data in order to render it more useful in interpreting the geophysical characteristics of the earth in the exploration for oil and gas deposits. More specifically, this invention relates to a method of processing seismic traces to accurately estimate the amplitude and phase spectrums of the seismic wavelet and then proceed to modify that wavelet into an output wavelet having the desirable features of zero phase and low sidelobe level for maximum resolution and dynamic range. Such output wavelet has been shown useful in analyzing the characteristics of the geological formation under investigation. Further, while the invention will be described with respect to the processing of seismic data, it is equally applicable to other types of geophysical data, such as well logs, gravity information, and magnetic data.

In seismic exploration, data is obtained by first creating an artificial disturbance along the earth by use of dynamite or the like. The resulting acoustic waves travel downwardly in the earth and are reflected upward from subsurface reflecting interfaces. The reflected waves are received at detectors (geophones or hydrophones) located along the surface and recorded in a reproducible form. Ideally, the waves recorded at the detectors would be exactly representative of the reflecting characteristics (referred to as the reflectivity function) of the earth without any undesirable components, such as noise or distortion.

Unfortunately, the signals recorded at the detectors contain many undesirable components which often obscure the reflectivity function of the earth and prevent the finding of an area of the earth where oil and gas deposits may be present. One undesirable component of the recorded seismic data is due to the seismic disturbance created by the explosion of dynamite and known as the shot pulse. Ideally, the time waveform of the shot pulse should be a simple short pulse, such as an impulse or a square wave. Instead, the shot pulse resulting from the explosion of dynamite, or almost any other known seismic source, is a complex train of wavelets. As a result, the reflectivity function of the earth is obscured by the complex waveforms of the reflected shot pulse appearing on the recorded data. To make matters worse, the shot pulse changes in amplitude and shape with depth in the earth so that the recorded data contains reflections of a time-varying shot pulse. Other undesirable components in the seismogram may be referred to collectively as the distortion operator. These include the effect of multiple reflections, ghosts, reverberations, and other types of distortion known in the seismic art. Furthermore, the effect of the distortion operator is intermixed in a complex way with the shot pulse. Therefore, the distortion operator and the shot pulse may be lumped together as a single component and called the distorted shot pulse, or seismic wavelet. It is desirable to remove the effects of the distorted shot pulse on the seismogram, but the difficulty is that the waveform of the distorted shot pulse is unknown.

The traditional method of deconvolution, generally known as "flat-iron" or Wiener-Levinson deconvolution method, assumes that the seismic wavelet is minimum phase or "front-loaded". It is also assumed the reflectivity function is white (i.e. its amplitude spectrum is constant with frequency.) Under these assumptions, the amplitude spectrum of the wavelet and the amplitude spectrum of the seismic trace are equivalent. Further, once the amplitude spectrum is determined, the phase spectrum can be easily calculated by using the above-mentioned assumption that the wavelet is minimum phase after sampling. Once the seismic wavelet is estimated from the calculated amplitude spectrum and phase spectrum, an inverse filter can be designed to compress the seismic wavelet into a short output wavelet close to a spike. In the actual implementation of the Wiener-Levinson method, the inverse filter is calculated in one step from the autocorrelation of the seismic trace. Since the filter calculated in the Wiener-Levinson method is minimum phase, the output wavelet tends to be minimum phase, instead of zero phase. It is the purpose of this invention to improve upon the results of the prior art deconvolution method by providing better phase compensation than Wiener-Levinson deconvolution and thus produce a zero phase output wavelet. In contrast to prior methods, this invention assumes that the analog seismic wavelet is minimum phase but recognizes that the minimum-phase property is not necessarily preserved after sampling. This invention also avoids errors in the phase estimate of the wavelet by prior art methods caused by noise. Such noise is either actually present on the seismic trace, or artificially introduced to stabilize filter design.

A method of processing geophysical data which improved upon the above-described method was disclosed in U.S. Pat. No. 3,396,365, issued to Clyde W. Kerns for a method of processing geophysical data with stable inverse filters. Kerns discloses a method of processing seismic data to suppress coherent noise such as multiples, reverberations and ghosts. In Kerns, an autocorrelation function is produced from an input seismic signal to characterize the noise. A white spike is added to the center point of the autocorrelation function to assure the stability of an inverse filter which is generated from the autocorrelation function. The input seismic signal is then convolved with the inverse filter to produce a filtered signal with the undesired components suppressed.

It should be noted, however, that the use of methods such as those disclosed in Kerns as well as the prior art Wiener-Levinson method typically includes the estimation of seismic wavelet amplitude spectrum by assuming a white reflectivity. One drawback to such an assumption is that any deviation of the reflectivity from whiteness produces a biased (and thus inaccurate) estimate of the amplitude spectrum. Subsequent use of this estimate in deconvolution will result in removing part of the reflectivity information sought in performing the above-described procedure. Therefore, in accordance with this invention, the effects of the nonwhite reflectivity of the earth formation upon the processed wavelet is reduced by averaging the autocorrelation function of the seismic trace over several traces in the shot to thus whiten the reflectivity. In such a manner, this invention improves over both the Wiener-Levinson and Kerns methods.

SUMMARY OF THE INVENTION

Seismic exploration is conducted within a subsurface region to yield seismic data regarding the geophysical characteristics of the explored region. The seismic data is then processed such that important geophysical information regarding the presence of oil or other hydrocarbons may be acquired. In particular, accurate estimations of the amplitude and phase spectra of the seismic wavelet are estimated and used to produce a two-sided least squares filter that will shape the estimated seismic wavelet into a zero-phase, low sidelobe output wavelet.

The specific method used to estimate the amplitude and phase spectra for the seismic wavelet include the selection of seismic traces (or portions thereof) of sufficient interest to warrant further investigation. Such seismic traces x(t) are manipulated to produce an amplitude spectrum A(F) for each seismic trace x(t). The autocorrelation function $\phi(\tau)$ for each seismic trace x(t) is calculated and fourier transformed to yield the square of the frequency domain amplitude spectrum. The amplitude spectrums A(F) are stacked and the average amplitude spectrum calculated so that the effects of nonwhite reflectivity are ameliorated. The estimated amplitude spectrum will then be smoothed using a process known as cepstral windowing. A typical cepstral windowing of the autocorrelation function includes transforming the averaged amplitude spectrum from the frequency domain to the frequency domain using the inverse Fourier transform of the logarithm of the averaged amplitude spectrum, selecting a cepstral window length, windowing the frequency domain amplitude spectrum and transforming the cepstrum frequency domain amplitude spectrum back into the frequency domain. Such cepstral windowing is further intended to reduce the effects of the reflectivity leakage of the amplitude spectrum. The cepstral windowed amplitude spectrum will then be amortized at low signal to noise ratios so that the amplitude spectrum will approximate the analog case. Amortization is also designed to prevent inaccuracies in the later estimation of the phase spectrum for the seismic wavelet. Low-end amortization is performed using the characteristics of the low-cut field filter of the field recording system. High-end amortization is performed using the characteristics of the earth filter and the high-cut field filter of the field recording system. The amortized amplitude spectrum is again subjected to cepstral windowing to eliminate rapidly varying components of the amplitude spectrum and the resultant amplitude spectrum is then used to estimate the phase spectrum for the seismic wavelet. A two-sided least squares filter may then be calculated and applied to the seismic traces to shape the seismic wavelet into a zero-phase low side lobe output wavelet.

It is a feature of this invention to provide a method of processing seismic data which will yield a better estimation of the amplitude and phase spectrum of the seismic wavelet. Another feature of this invention reduces the effects of reflectivity leakage and rapidly varying components upon the estimated amplitude spectrum.

BRIEF DESCRIPTION OF THE DRAWINGS

The present invention may be better understood and its numerous objects and advantages will become apparent to those skilled in the art by reference to the accompanying drawings in which:

FIGS. 3a-c illustrate waveforms used in describing the process illustrated in FIG. 4. Specifically, FIG. 3b illustrates the amplitude spectrum after the first cepstral windowing of FIG. 3a.

DESCRIPTION OF THE PREFERRED EMBODIMENT

An understanding of conventional seismic exploration will be a most helpful prerequisite to the development of the background theory upon which the present invention is predicated. Therefore, reference will first be had to FIG. 1 which diagrammatically illustrates a conventional seismograph system.

Figure 1:
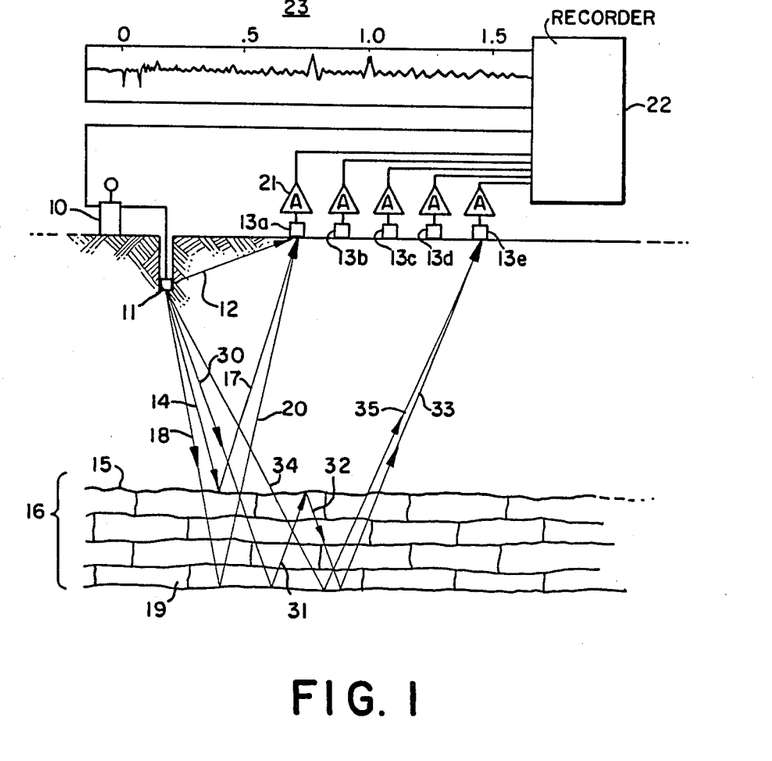
FIG. 1 illustrates a seismic exploration system for acquiring seismic data.

Upon actuation of blaster 10, a generator of acoustic energy such as a small charge 11 of an explosive, such as dynamite, produces an acoustic pulse. White other forms of seismic wave generators may be utilized, the detonation of an explosive is a wave generator of conventional type. It initiates the travel of seismic waves from the shot point 11 downwardly through the earth strata and also by way of a more or less direct path 12 to the first detector geophone 13a. The downwardly traveling wave, as along the path 14, is reflected from the upper surface 15 of a relatively thick high velocity bed 16. The reflected wave travels along the path 17 to the detector 13a. Seismic energy also travels by way of a path 18 to a reflection point at the bottom 19 of the bed 16, this energy returning by way of path 20 to the detector 13a. Electrical signals generated by the detector 13a are applied to an amplifier 21 including the usual adjustable filters, and its output, in turn, is applied to a recorder 22.

Figure 2:
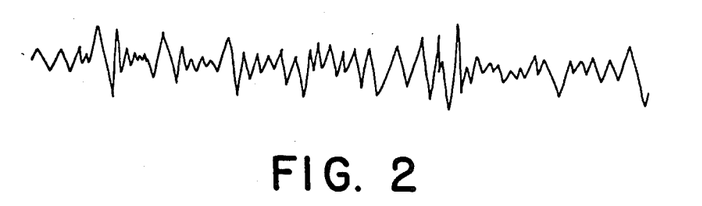
FIG. 2 illustrates a typical seismic trace derived from seismic exploration of a geophysical formation utilizing the seismic exploration system of FIG. 1.

A series or group of seismic traces similar to the seismic trace shown in FIG. 2, which are acquired by the standard seismic exploration techniques described above or other seismic exploration techniques may be used to yield valuable information regarding the geophysical characteristics of the explored subsurface region by manipulating such seismic data in accordance with the methods described below and made reference to by the flowchart labelled FIG. 4.

The conventional model of seismic data provides that:

$$x(t) = r(t) * b(t) \tag{1}$$

where
 x(t) is the seismic trace;
 r(t) is the earth reflectivity function; and
 b(t) is the seismic wavelet.

Figure 4A:
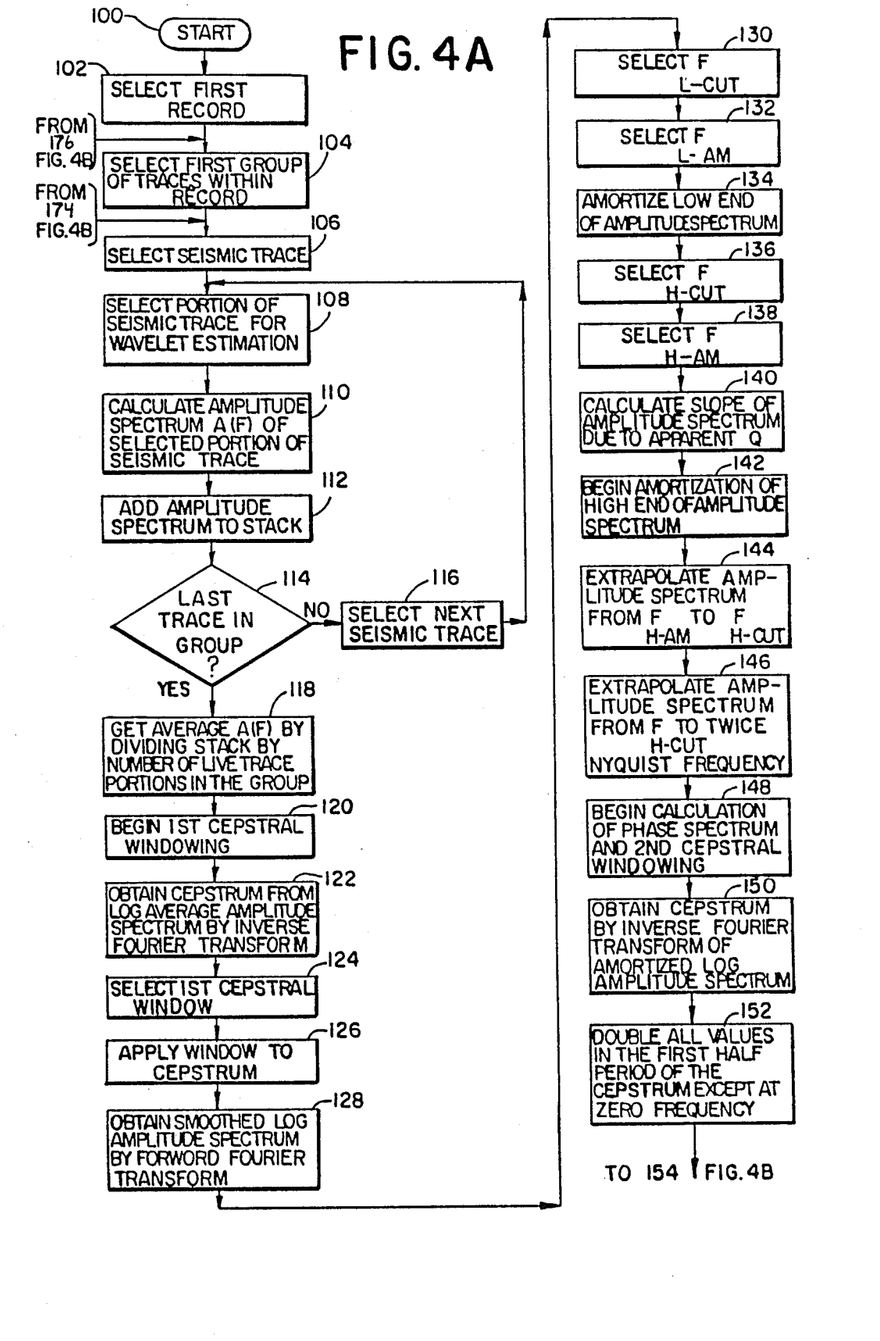
FIGS. 4a-b are a flowchart of the major steps of the method of interpreting seismic data by manipulating the input seismic traces to produce seismic traces with an optimum output wavelet to calculate an output wavelet to aid in interpretation of the geophysical formation being explored.
Figure 4B:
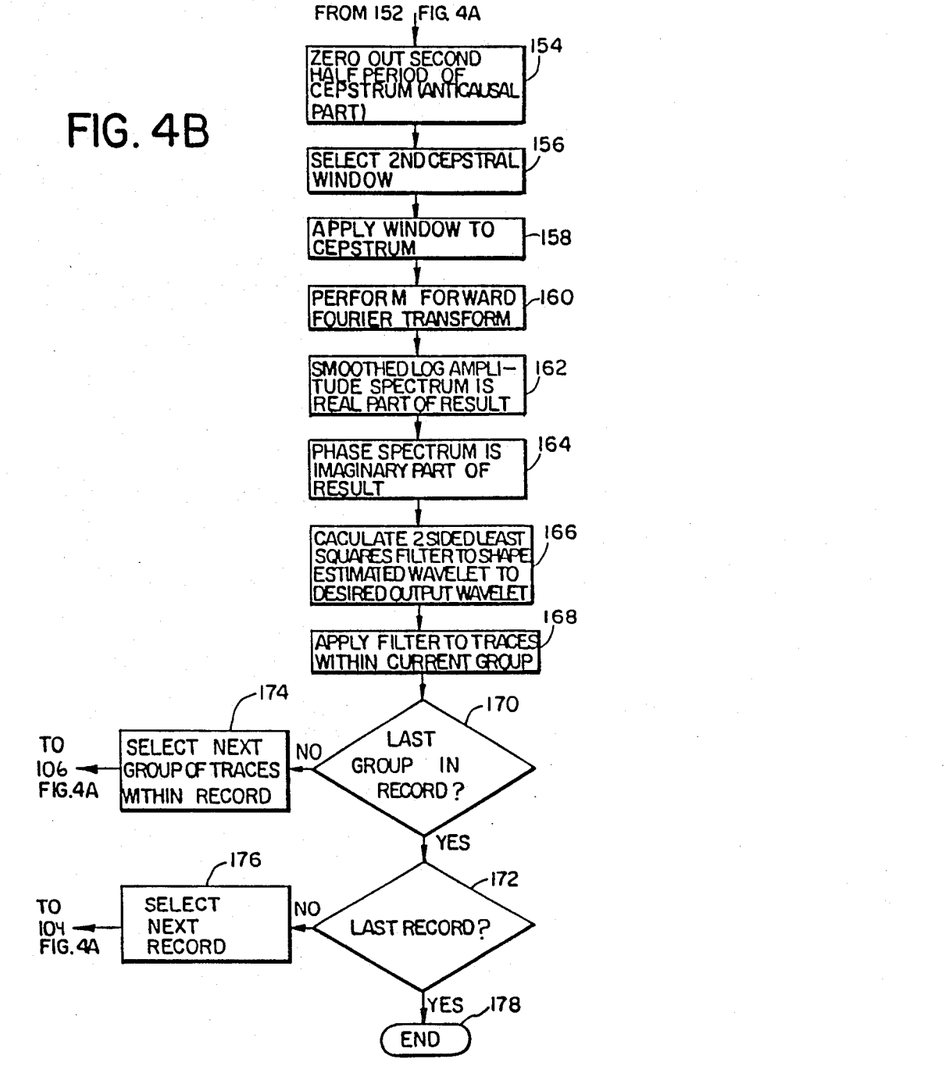

The method of interpreting seismic data commences at step 100 of FIG. 4a. Typically the seismic data acquired by the seismic exploration system of FIG. 1 would consist of any number of seismic records, each seismic record including at least one group of seismic traces, each group recorded in response to a single generation of seismic energy by generation 11 of the seismic exploration system. Each seismic trace would be similar to the seismic trace of FIG. 2 shown here by way of example and indicative of the seismic data acquired at each of the detectors 13 included as part of the seismic exploration system.

A first seismic record consisting of a number of groups of seismic data is selected at 102. A group of seismic traces which corresponds to seismic data recorded at a plurality of detectors in response to generation of seismic energy at a single location is selected at step 104. A first seismic trace corresponding to data recorded at one of plural detectors is then selected at 106. The portion of the seismic trace for which interpretation is desired is selected at 108. The selected portion would typically be noted by a seismic event of interest. Such selected data may comprise either the entire seismic trace or a portion of it. The amplitude spectrum A(f) of the selected seismic trace x(t) is then calculated at 110. The amplitude spectrum A(f) is calculated at 110 by manipulating the autocorrelation function $\phi(\tau)$ of the seismic trace x(t). For a seismic trace x(t), the autocorrelation function $\phi(\tau)$ may be defined as the limit as T approaches infinity of ½ T times the integral from $-T$ to T of $x(t)x(t-\tau)$ dt where $\tau$ is a time delay parameter.

The square of the frequency domain amplitude spectrum A(f) for the seismic trace x(t) is then calculated by taking the Fourier transform of the autocorrelation function $\phi(\tau)$ for the seismic traces x(t). Such step of calculating the frequency domain amplitude spectrum may be alternately represented by reference to the following relationship:

$$[A(f)]^2 = F[\phi(\tau)] \qquad (2)$$

Further, while the square of the frequency domain amplitude spectrum for the power spectrum is suitable for the analysis techniques to be described herein, it should be noted that the unsquared frequency domain amplitude spectrum or the dB amplitude spectrum (also known as the logpow spectrum) are also suitable alternatives for the described analysis techniques. In the specific analysis techniques to follow, the amplitude spectrum A(f) is utilized.

Figure 3A:
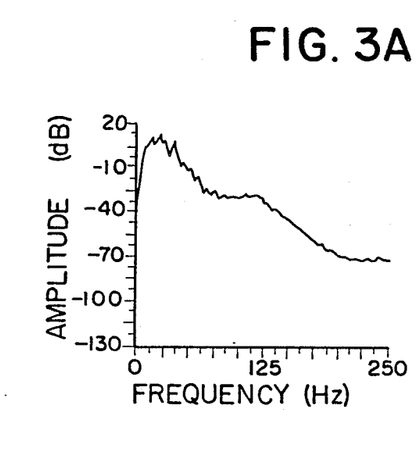
FIG. 3a illustrates the stacked and averaged amplitude spectrum of seismic traces.
Figure 3B:
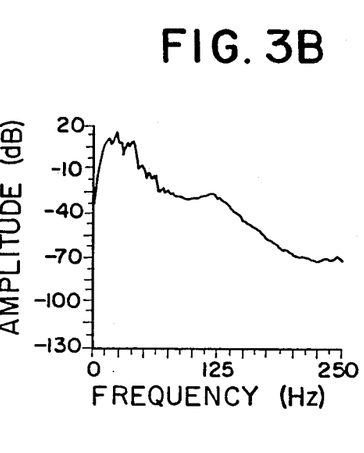
Figure 3C:
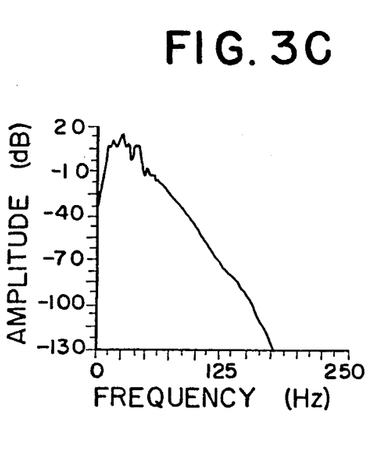
FIG. 3c illustrates the amplitude spectrum after amortization and second cepstral windowing of the seismic wavelet.

As discussed previously, one basic assumption in the prior art methods was that the amplitude spectrum of the reflectivity function is white when averaged over a shot record. Such an assumption has been shown not only to be incorrect but also that such an assumption adversely affects the accuracy of the results of processing methods which make the assumption that the reflectivity is white. To ameliorate the effect of nonwhite reflectivity, the amplitude spectrum A(f) of the several seismic data traces x(t) are averaged. Such averaging (or stacking) of seismic trace amplitude spectrums is designed to make use of differential moveout to whiten the effective reflectivity. As the trace offset increases, events move closer in time. This moveout compression is not uniform, but its effect in the frequency domain can be inferred by considering the case of uniform compression. Uniform compression is a scaling of the time axis which results in an inverse scaling (stretch) of the frequency axis as follows:

$$y(t) = X(at) \rightarrow Y(f) = \frac{(1)}{(a)} \times \frac{(f)}{(a)} \qquad (3)$$

For this reason, any spectral valleys in the reflectivity spectrum will tend to average out resulting in the average spectrum being flatter (more white) than the individual spectra.

Therefore, stacking of the amplitude spectrums A(F) begins at 110 with the adding of the first amplitude spectrum A(F) of seismic trace x(t) to the stack, the stack being defined as the sum of all amplitude spectrums. If it is determined at 114 that all trace amplitude spectrums A(F) have been placed in the stack, then the algorithm will continue at 118. If it is determined at 114 that there are additional seismic traces which have not been analyzed, the next seismic trace will be selected at 116 and the algorithm will return to step 108. Once all seismic traces (or selected portions thereof) have had their respective amplitude spectrum A(F) calculated and added to the stack, the algorithm will proceed to 118 where the average amplitude spectrum A(F) of the stacked spectrums will be calculated by dividing the stack by the number of seismic traces (or portions thereof) in the group.

A smoothing process of the average amplitude spectrum A(F) known as cepstral windowing then commences at 120. Cepstral windowing will reduce the effects of reflectivity leakage in the amplitude spectrum. To accomplish this, the stack is transformed from the frequency domain to the frequency domain at 122. Such transformation may be accomplished by taking the inverse Fourier transform of the logarithm of the amplitude spectrum. Such transformation may be alternatively represented by reference to the following relationship:

$$F^{-1}[\log|A(f)|] = \hat{a}(t) \qquad (4)$$

A first cepstral window length is then selected at 124. While the selected window length will vary with the characteristics of the particular function being windowed, we have found that a cepstral window of 300 msec will yield satisfactory results for the typical function windowed as part of the present invention. The time domain function is cepstral windowed at 126 using the selected cepstral window length, followed by the forward Fourier transformation of the windowed frequency domain function back to the frequency domain at 128 to yield the smoothed log amplitude spectrum.

By performing the above described steps, a good estimate of the amplitude spectrum of the seismic wavelet in the useful seismic band will be determined. In order to accomplish the previously discussed goals of this invention, an accurate estimation of the seismic wavelet in the low signal-to-noise regions (typically, the low and high frequency ends of the amplitude spectrum) is also necessary. Such estimation steps, which are to be described in the immediately following passage, are necessary because the phase spectrum is proportional to the Hilbert transform of the dB spectrum, and not the amplitude spectrum itself. Thus, low amplitude spectrum values can still have an important effect on the phase. Therefore, some method of "compensation" of these low signal to noise regions is necessary to permit the development of an accurate phase spectrum for the seismic wavelet. Such a procedure of compensating the amplitude spectrum by estimating the amplitude of the seismic wavelet at low and high frequencies is typically known as "amortization" of the amplitude spectrum.

Amortization of the amplitude spectrum of the seismic wavelet commences at 130 by the selection of $f_{L\text{-}cut}$. $f_{L\text{-}cut}$ is determined by the characteristics of a low cut filter which is included as part of a typical field recording system being used to record the seismic data. The low-cut filter is utilized in field recording systems to eliminate low frequency ground-roll noise. A low amplitude spectrum frequency $f_{L\text{-}am}$ at which to commence the low-end amortization process is then selected at step 132. While the frequency at which low-end amortization should commence may vary, amortization often becomes necessary at frequencies below 20 Hz. The low-end amortization of the seismic wavelet amplitude spectrum is then performed at 134 by the extrapolation of the amplitude spectrum according to the characteristics of the low-cut filter for frequencies below $f_{L-am}$.

High-end amortization of the amplitude spectrum of the seismic wavelet by the selection of $f_{H-cut}$. $f_{H-cut}$ is determined by the characteristics of a high-cut filter which is included as part of a typical field recording system. The high-cut filter is utilized in field recording systems to prevent aliasing when the data is sampled. A second high frequency $f_{H-am}$ is them selected at 138 as the frequency at which to commence high-end amortization. While the particular $f_{H-am}$ selected for beginning high end amortization may vary, we have found that high end amortization is necessary when the random noise begins to dominate the spectrum. Such effect may become marked and therefore require amortization between 60 and 125 Hz. Once $f_{H-cut}$ and $f_{H-am}$ have been selected, the slope of the amplitude spectrum within that seismic band due to the apparent Q, the earth filter constant is determined at 140. Such a calculation may be performed utilizing numerous methods. Speaking in the most general terms, a slope for the amplitude spectrum in the seismic band is selected which will correspond to a value of Q.

Once the slope of the amplitude spectrum of the seismic wavelet for frequencies past $f_{H-am}$ has been determined, amortization of the high end of the amplitude spectrum commences at 142 with the slope of the seismic band due to the apparent Q being used to extrapolate at 144 the amplitude spectrum from $f_{H-am}$ to $f_{H-cut}$. At 146, the amplitude spectrum of the seismic wavelet is extrapolated from $f_{H-cut}$ to the twice-Nyquist frequency by applying the slope of the high cut filter to the amplitude spectrum between those two points. A twice-Nyquist frequency is selected as the upper limit of the estimated amplitude spectrum necessary to produce satisfactory results in the aforementioned goal of approximating the analog case for the amplitude spectrum.

Having successfully approximated the amplitude spectrum of the analog seismic wavelet, the invention will now proceed to utilize the amortized amplitude spectrum to complete the estimation of the seismic wavelet by calculating its phase. Calculation of the phase spectrum commences at 148 with a second cepstral windowing of the amortized amplitude spectrum. Such method of cepstral windowing is the same as the previously performed cepstral windowing process. Therefore, the amplitude spectrum is transformed from the frequency domain to the frequency domain at 150 by the inverse Fourier therefor of the amortized log amplitude spectrum. Such transformation may be represented by the relationship $$\hat{a}(t) = F^{-1}[\log|A(f)|]. \quad (5)$$

In such a manner the cepstrum of the amplitude spectrum is obtained. All values in the first half period of the cepstrum except for the zero frequency are then doubled at 2. At 154, the second half period of the cepstrum (known as the anticausal part) is zeroed out. A second cepstral window length is then selected at 156. Again, the selected cepstral window length will vary depending on the characteristics of the particular function being windowed. The frequency domain cepstrum is then windowed at 158 using the selected cepstral window length, followed by transformation of the windowed frequency domain cepstrum back to the frequency domain at 160 by use of a forward Fourier transformation. The forward Fourier transform of the windowed frequency domain cepstrum will yield both a real and imaginary part. The real part of the forward Fourier transform of the windowed frequency domain cepstrum is shown at 162 to be the smoothed log amplitude spectrum. The imaginary part of the forward Fourier transform of the windowed frequency domain cepstrum is shown at 164 to be the phase spectrum.

The phase spectrum calculated in step 164 is next used to prepare at 166 a two-sided, least square filter to shape the estimated wavelet into a zero-phase low sidelobe output wavelet. Such methods of shaping the output wavelet once the amplitude and phase spectrum have been calculated are well known in the art. At 168, the two-sided, least square filter calculated at step 166 is applied to the seismic traces within the current group to shape the seismic wavelet zero-phase low side lobe output wavelet.

Proceeding to step 170, if the last group of seismic traces in the record has not been processed, the next group of seismic traces with the record are selected at 174 and processing continues at step 106. If the last group of seismic traces of the record have been processed at 170, a determination is then made at 172 whether the last record of groups of seismic traces for which processing is desired have been processed. If the last records has not been processed, the processing continues at step 104. If the last record has been processed, processing ends at step 178.

Thus, there has been described and illustrated herein a method for processing geophysical data to accurately estimate the seismic wavelet for a geophysical formation. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

The invention as described herein has been embodied in a fortran language computer program. Such computer program is included as an appendix to this disclosure as an example of one embodiment of the invention.

What is claimed is:

1. In seismic exploration of a subsurface formation wherein seismic source are activited at spaced locations along a line of exploration and the amplitude of reflections are recorded as a function of time along said lines to produce a series of seismic traces, a method of compensating the amplitude spectrum of a selected one of said seismic traces for the effects of non-white reflectivity of said subsurface formation comprising:

whitening effective reflectivity of said amplitude spectrum of said selected seismic trace;

reducing the effects of reflectivity leakage on said amplitude spectrum of said selected seismic trace, said step of reducing the effects of reflectivity leakage further including the steps of transforming said amplitude spectrum from the frequency domain into the frequency domain, selecting a first cepstral window length, applying first cepstral window to said frequency domain amplitude spectrum, and transforming said amplitude spectrum from said frequency domain to said frequency domain;

compensating said amplitude spectrum of said selected seismic trace to approximate that of an analog seismic wavelet; and smoothing said compensated amplitude spectrum to eliminate rapidly varying components, said step of smoothing said compensated amplitude spectrum further including the steps of transforming said amplitude from the frequency domain into the frequency domain, selecting a second cepstral window length, applying said second cepstral window to said frequency domain amplitude spectrum, and transforming said amplitude spectrum from said frequency domain to said time domain.

2. The method of claim 1 wherein the step of compensating said amplitude spectrum of said selected seismic trace to approximate that of an analog seismic wavelet further comprises the steps of:

amortizing low frequencies of said amplitude spectrum to remove the effect of low fequency noise such as ground roll from the estimate of the wavelet amplitude spectrum; and amortizing high frequencies of said amplitude spectrum to remove the effect of high frequency noise from the estimate of the wavelet amplitude spectrum.

3. The method of claim 2 wherein the step of amortizing said low frequencies of said amplitude spectrum to eliminate low frequency ground roll noise further comprises the steps of:

selecting a low frequency value at which to commence low end amortization; and applying the slope of the low cut filter to the portion of said amplitude spectrum having a frequency less than said low frequency value.

4. The method of claim 2 wherein the step of amortizing the high frequencies of said amplitude spectrum to prevent aliasing of said seismic data further comprises the steps of:

selecting a first and second high frequency value to commence high end amortization;

applying said characteristics of the earth filter to the portion of the amplitude spectrum between said first and said second high frequency values; and applying the slope of the high cut filter to the portion of said amplitude spectrum between said second high frequency value and an upper limit frequency.

5. The method of claim 4 wherein said upper limit frequency is two times the Nyquist frequency.

6. The method of claim 1 wherein the step of whitening effective reflectivity of said amplitude spectrum of said selected seismic trace further comprises the steps of:

determining an autocorrelation function for each of said series of seismic traces;

determining an amplitude spectrum for each of said series of seismic traces from said autocorrelation functions;

stacking said amplitude spectrums for said series of seismic traces; and determining an average amplitude spectrum for said selected seismic trace from said stacked amplitude spectrums.

7. The method of claim 1 wherein the stpe of smoothing said compensated amplitude spectrum to eliminate rapidly varying components further comprises the steps of:

doubling all values greater than zero in a first half period of said frequency domain amplitude spectrum; and removing all values in a second half period of said frequency domain amplitude spectrum.

8. A method of processing geophysical data to make it more useful in interpreting subsurface characterstics of the earth comprising:

acquiring at least one seismic trace containing information related to the subsurface characteristics of the earth;

determining an amplitude spectrum for each of said at least one seismic trace;

whitening effective reflectivity of each of said at least one seismic trace;

compensating said amplitude spectrum of said at least one seismic trace to approximate an analog seismic wavelet;

estimating a phase spectrum for said seismic wavelet from said compensated seismic wavelet;

determining a two sided, least squares filter from said estimated phase spectrum; and determining an output seismic wavelet from said compensated amplitude spectrum and said estimated phase spectrum by applying said two sided, least squares filter to said compensated amplitude spectrum in the time domain;

wherein said seismic wavelet is shaped into a zero-phase, low side-lobe output wavelet.

9. The method of claim 8 wherein the step of compensating said amplitude spectrum of said at least one seismic trace to approximate an analog seismic wavelet further comprises the step of reducing the effects of reflectivity leakage on said amplitude spectrum for said at least one seismic trace.

10. The method of claim 9 further comprising the step of smoothing said amplitude spectrum for said at least one seismic trace to eliminate rapidly varying components of said amplitude spectrum.

11. The method of claim 10 wherein the step of reducing the effects of reflectivity leakage on said amplitude spectrum for said at least one seismic trace further comprises the steps of:

transforming said at least one amplitude spectrum from the frequency domain into frequency domain;

selecting a first cepstral window length;

applying said first cepstral window to said frequency domain amplitude spectrum; and transforming said amplitude spectrum from said frequency domain to said time domain.

12. The method of claim 11 wherein the step of smoothing said amplitude spectrum of said at least one seismic trace to eliminate rapidly varying components of said amplitude spectrum further comprises the steps of:

transforming said at least one amplitude from the frequency domain into the frequency domain;

selecting a second cepstral window length;

applying said second cepstral window to said frequency domain amplitude spectrum; and transforming said amplitude spectrum from said frequency domain to said time domain.

13. The method of claim 12 wherein the step of smoothing said amplitude spectrum to eliminate rapidly varying components of said amplitude spectrum further comprises the steps of:

doubling all values greater than zero in a first half period of said frequency domain amplitude spectrum; and removing all values in a second half period of said frequency domain amplitude spectrum.

14. The method of claim 8 further comprising the steps of:
   determining an autocorrelation function for each of said at least one seismic trace;
   determining an amplitude spectrum for each of said at least one seismic trace from said autocorrelation function;
   stacking said amplitude spectrums for said at least one seismic trace; and
   determining an average amplitude spectrum for said at least one seismic trace from said stacked amplitude spectrums.

15. The method of claim 8 wherein the step of compensating said amplitude spectrum of said at least one seismic trace to approximate an analog seismic wavelet further comprises the steps of:
   amortizing low frequencies of said amplitude spectrum to remove the effect of low frequency noise such as ground roll from the estimate of the wavelet amplitude spectrum; and
   amortizing high frequencies of said amplitude spectrum to remove the effect of high frequency noise from the estimate of the wavelet amplitude spectrum.

16. The method of claim 15 wherein the step of amortizing low frequencies of said amplitude spectrum of remove the effect of low frequency noise such as ground roll from the estimate of the wavelet amplitude spectrum further comprises the step of:
   selecting a low frequency value at which to commence low end amortization; and
   applying the slope of the low cut filter to the portion of said amplitude spectrum having a frequency less than said low frequency value.

17. The method of claim 15 wherein the step of amortizing high frequencies of said amplitude spectrum to remove the effect of high frequency noise from the estimate of the wavelet amplitude spectrum further comprises the steps of:
   selecting a first and second high frequency value to commence high end amortization;
   applying said characteristics of the earth filter to the portion of the amplitude spectrum between said first and said second high frequency values; and
   applying the slope of the high cut filter to the portion of said amplitude spectrum between said second high frequency value and an upper limit frequency.

18. The method of claim 17 wherein said upper limit frequency is two times the Nyquist frequency.

19. In seismic exploration wherein seismic sources are activated at spaced locations along a line of exploration and where the amplitude of reflections are recorded as a function of time along said line to produce a series of seismic traces, a method of interpreting said seismic traces to provide information related to subsurface characteristics of the earth comprising the steps of:
   determining an amplitude spectrum for each of said series of seismic traces;
   whitening effective reflectivity of said series of seismic traces;
   reducing the effects of relectivity leakage on said amplitude spectrums of said series of seismic traces, said step of reducing the effects of reflectivity leakage further including the stpes of transforming said amplitude spectrums from the frequency domain into the frequency domain, selecting a first cepstral window length, applying said first cepstral window to said frequency domain amplitude spectrums, and transforming said amplitude spectrums from said frequency domain to said frequency domain;
   compensating said amplitude spectrums of said series of seismic traces to approximate an analog seismic wavelet, said step of compensating said amplitude spectrum of said series of seismic traces to approximate an analog seismic wavelet further including the steps of amortizing low frequencies of said amplitude spectrums to remove the effect of low frequency noise such as ground roll from the estimate of the wavelet amplitude spectrum and amortizing high frequencies of said amplitude spectrum to remove the effect of high frequency noise from the estimate of the wavelet amplitude spectrum;
   smoothing said compensated amplitude spectrums to eliminate rapidly varying components, said step of smoothing said compensated amplitude spectrums further including the steps of transforming said amplitude spectrums from the frequency domain into the frequency domain, selecting a second cepstral window length, applying said second cepstral window to said frequency domain amplitude spectrums, and transforming said amplitude spectrums from said frequency domain to said time domain;
   estimating a phase spectrum for said seismic wavelet from said smoothed compensated seismic wavelet;
   determining a two sided, least squares filter from said estimated phase spectrum; and
   determining an output seismic wavelet from said smoothed compensatedd amplitude spectrum said estimated phase spectrum by applying said two sided, least squares filter to said smoothed compensated amplitude spectrum in the time domain wherein said seismic wavelet is shaped into a zero-phase, low side-lobe wavelet.

20. The method of claim 19 further comprising the steps of:
   determining an autocorrelation function for said series of seismic traces;
   determining an amplitude spectrum for said series of seismic traces from said autocorrelation functions;
   stacking said amplitude spectrums for said series of seismic traces; and
   determining an average amplitude spectrum for said series of seismic traces from said stacked amplitude spectrums.

21. The method according to claim 19 wherein the step of amortizing low frequencies of said amplitude spectrum to remove the effect of low frequency noise such as ground roll from the estimate of the wavelet amplitude spectrum further comprises the steps of:
   selecting a low frequency value at which to commence low end amortization; and
   applying the slope of the low cut filter to the portion of said amplitude spectrum having a frequency less than said low frequency value.

22. The method to claim 19 wherein the step of amortizing high frequencies of said amplitude spectrum to remove the effect of high frequency noise from the estimate of the wavelet amplitude spectrum compriese the steps of:
   selecting a first and second high frequency value to commence high end amortization;

applying said characteristics of the earth filter to the portion of the amplitude spectrum between said first and said second high frequency values; and applying the slope of the high cut filter to the portion of said amplitude spectrum between said second high frequency value and an upper limit frequency.

23. The method of claim 19 wherein the step smoothing said amplitude spectrums to eliminate rapidly varying components of said amplitude spectrums further comprises the steps of:

doubling all values greater than zero in a first half period of said frequency domain amplitude spectrums; and removing all values in a second half period of said frequency domain amplitude spectrums.

* * * * *